US007487252B2

(12) United States Patent
Vossler

(10) Patent No.: US 7,487,252 B2
(45) Date of Patent: Feb. 3, 2009

(54) VEHICLE BASED INTELLIGENT NETWORK INTERACTIVITY

(75) Inventor: Stephen P. Vossler, Sioux Falls, SD (US)

(73) Assignee: Gateway Inc., Irvine, CA (US)

( * ) Notice: Subject to any disclaimer, the term of this patent is extended or adjusted under 35 U.S.C. 154(b) by 564 days.

(21) Appl. No.: 09/991,090

(22) Filed: Nov. 16, 2001

(65) Prior Publication Data

US 2003/0097477 A1    May 22, 2003

(51) Int. Cl.
*G06F 15/16*    (2006.01)
(52) U.S. Cl. .................. 709/232; 709/223; 709/249; 455/422.1; 455/456.1; 370/328
(58) Field of Classification Search ......... 709/227–229, 709/237, 249; 340/988–996; 701/200–204, 701/300–302
See application file for complete search history.

(56) References Cited

U.S. PATENT DOCUMENTS

| | | | | | |
|---|---|---|---|---|---|
| 5,257,406 | A | * | 10/1993 | Ito | 455/445 |
| 5,696,903 | A | * | 12/1997 | Mahany | 709/228 |
| 5,990,928 | A | * | 11/1999 | Sklar et al. | 725/72 |
| 6,012,012 | A | * | 1/2000 | Fleck et al. | 701/200 |
| 6,014,607 | A | | 1/2000 | Yagyu et al. | |
| 6,088,363 | A | * | 7/2000 | Shiobara | 370/461 |
| 6,091,956 | A | * | 7/2000 | Hollenberg | 455/456.5 |
| 6,150,961 | A | | 11/2000 | Alewine et al. | |
| 6,161,018 | A | * | 12/2000 | Reed et al. | 701/300 |
| 6,161,071 | A | | 12/2000 | Shuman et al. | |
| 6,169,896 | B1 | * | 1/2001 | Sant et al. | 455/424 |
| 6,209,026 | B1 | | 3/2001 | Ram et al. | |

(Continued)

FOREIGN PATENT DOCUMENTS

WO    WO 00/52851    9/2000

(Continued)

OTHER PUBLICATIONS

Microsoft Debuts Concept Home Under one roof, concept home brings together technologies for better living www.microsoft.com/P...ass/press/2000/Jan00/HomeDebutCESpr.asp.

(Continued)

*Primary Examiner*—Bunjob Jaroenchonwanit
*Assistant Examiner*—Dohm Chankong
(74) *Attorney, Agent, or Firm*—Ross F. Hunt, Jr.; Stites & Harbison, PLLC

(57) ABSTRACT

A method and apparatus that interactively determine which data is exchanged between two networks or devices operating on the networks and the order in which the data is transferred. One of the networks can be a vehicle area network. The determination is capable of being based on one or more data criteria, including file size, user access, device interaction, user preferences, history of use, and so on. The available time in which to communicate is forecasted so that the appropriate data can be transmitted. It is emphasized that this abstract is being provided to comply with the rules requiring an abstract that will allow examiners and other searchers to quickly ascertain the subject matter of the technical disclosure. It is submitted with the understanding that it will not be used to interpret or limit the scope or meaning of the claims, as promised by the rules of the Patent Office.

4 Claims, 5 Drawing Sheets

U.S. PATENT DOCUMENTS

| | | | |
|---|---|---|---|
| 6,222,463 | B1 | 4/2001 | Rai |
| 6,336,143 | B1* | 1/2002 | Diedrich et al. ............. 709/231 |
| 6,438,581 | B1* | 8/2002 | Neuhauser et al. .......... 709/205 |
| 6,522,875 | B1* | 2/2003 | Dowling et al. .......... 340/995.1 |
| 6,590,507 | B2* | 7/2003 | Burns ......................... 701/213 |
| 6,597,906 | B1* | 7/2003 | Van Leeuwen et al. ... 455/422.1 |
| 6,636,790 | B1* | 10/2003 | Lightner et al. ............... 701/33 |
| 6,643,581 | B2* | 11/2003 | Ooishi ........................ 701/207 |
| 6,721,572 | B1* | 4/2004 | Smith et al. .............. 455/456.1 |
| 6,742,037 | B1* | 5/2004 | Hall et al. ................... 709/228 |
| 6,757,262 | B1* | 6/2004 | Weisshaar et al. .......... 709/228 |
| 6,775,298 | B1* | 8/2004 | Aggarwal .................. 370/473 |
| 6,788,951 | B2* | 9/2004 | Aoki et al. ................. 340/936 |
| 6,803,862 | B2* | 10/2004 | O'Connor et al. ........... 340/994 |
| 6,898,432 | B1* | 5/2005 | Jiang ........................ 455/456.1 |
| 6,996,393 | B2* | 2/2006 | Pyhalammi et al. ...... 455/412.1 |
| 7,020,468 | B2* | 3/2006 | Squibbs et al. .............. 455/445 |
| 2002/0032507 | A1* | 3/2002 | Diaz et al. ..................... 701/33 |
| 2002/0083185 | A1* | 6/2002 | Ruttenberg et al. ......... 709/232 |
| 2005/0058149 | A1* | 3/2005 | Howe ......................... 370/428 |

FOREIGN PATENT DOCUMENTS

| | | |
|---|---|---|
| WO | WO 00/77620 | 12/2000 |
| WO | WO 01/27790 | 4/2001 |

OTHER PUBLICATIONS

C/Net News.Com MobileAria is getting ready for its solo http://news.cnet.com/0-1006-200-5148833.html.

* cited by examiner

VEHICLE BASED INTELLIGENT NETWORK INTERACTIVITY

BRIEF DESCRIPTION OF THE DRAWINGS

The numerous advantages of the present invention may be better understood by those skilled in the art by reference to the accompanying figures in which.

DETAILED DESCRIPTION

Figure 1:
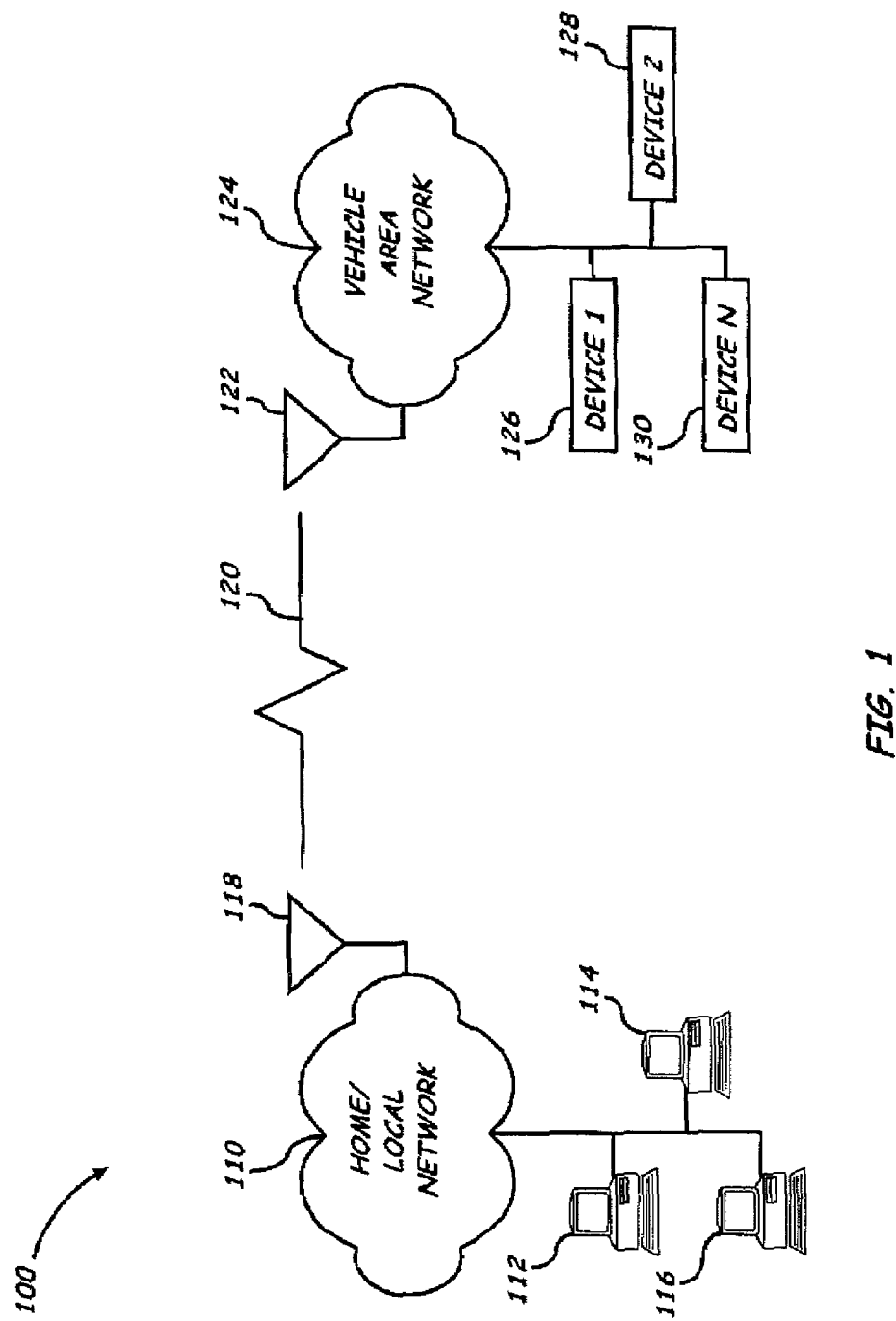
FIG. 1 is a system diagram of a home or local area network in communication with a vehicle area network in accordance with the present invention.

Referring now to FIG. 1, a system diagram of a local area network in communication with a vehicle area network in accordance with the present invention will be discussed. An interactive network-to-network system 100 is shown wherein a home or local area network (LAN) 110 is capable of communicating with a vehicle area network (VAN) 124. For example, LAN 110 may be a home network system set up in a user's house that includes one or more connected network devices 112, 114, and 116 communicatively coupled via LAN 110. LAN 110 may include hard-wired network connections, for example using an Ethernet compatible network using one or more Ethernet adapters, or a home phone network using one or more home phone network adapters (HPNA). Alternatively, at least one or more of network devices 112, 114, and 116 may connect to LAN 100 via wireless networking standard such as an IEEE 802.11 compliant wireless network standard. Likewise, VAN 124 includes one or more network devices 126, 128, and 130, up to N number of network devices. Network devices 112, 114, and 116, and network devices 126, 128, and 130 can include any type of electronic device capable of communicating with either of LAN 110 or VAN 124 and with respective devices thereof. Such types of electronic devices include, but are not limited to, personal computers (PCs), notebook computers, routers, hubs, switches, personal digital assistants (PDAs), game consoles, electronic books (e-books), audio devices such as MP3 players, computer watches, and so on, including any type of electronic device having network communication functions. Specifically for VAN 124, devices 126, 128, and 130 may include systems or subsystems of the vehicle itself in which VAN 124 is disposed, such as engine sensors, audio system components, vehicle indicators, gauges, and general sensors, such as fuel gauges, door sensors, light system sensors, heating and cooling system and sensors, odometer, seatbelt sensors, child detectors, and so on. Further, portable devices brought into the vehicle in which VAN 124 is disposed may also communicate with other devices on VAN 124. Such devices may include PDAs, portable computers, gaming devices, tools, global positioning system (GPS) devices, cellular telephones, and so on. When the vehicle in which VAN 124 is disposed enters within proximity to LAN 110, VAN 124 is capable of establishing communications with LAN 110 via a wireless network communications medium 120 using corresponding transmission systems 118 and 122 of LAN 110 and VAN 122 accordingly. Thus transmission system 118 and 122 provide for transferring information between the network. Such transmission systems include infrared (IR) transmissions such as an Infrared Developers Association (IRDA) compliant standard, or radio frequency (RF) transmissions such as a Bluetooth compliant standard. In an alternative embodiment, wireless network communications medium 120 is a hard-wired network and transmission systems 118 and 122 are suitably adapted therefor.

Network interactivity between LAN 110 and VAN 112 is established in one or more embodiments or scenarios of the invention. For example, a user may install LAN 110 in the user's home and install VAN 124 in the user's automobile. When the user parks the vehicle in the driveway or the garage, or optionally in the street, near, inside, or proximate to the home, interactivity and communications between LAN 110 and VAN 124 can be established. For example, fuel consumption and distance traveled data is logged by one of devices 126, 128, and 130, based on the travel activity of the vehicle. When the user returns the vehicle to the home, VAN 124 establishes communication with LAN 110 and transmits the fuel consumption and distance traveled data to one of devices 112, 114, and 116 of LAN 110 via network communications link 120. For example, the user may track such vehicle data in a database on the user's home PC. As another example, the vehicle is serviced by a service station for maintenance purposes, and the type of work completed on the vehicle is stored in one of devices 126, 128, and 130. When the user gets home, the service data is transferred to one of devices 112, 114, and 116 for logging vehicle service data. In another embodiment, LAN 110 is disposed in a gasoline service station. When the user stops at the service station for refueling, LAN 110 communicates with VAN 124 by transmitting information of interest to the user, for example, food or restaurant specials, weather information, news, road conditions, maps or directions, and so on. The user may set preferences for VAN 124 to indicate which types of information the user is desirous of or amenable to receiving from LAN 110. Furthermore, the user may store credit card information or other financial or banking information in one of devices 126, 128, and 130 so that a financial transaction occurs automatically between LAN 110 and VAN 124 in accordance with user settings and preferences on VAN 124. For example, the user indicates the desire to receive directions to restaurants within a 10-mile distance of LAN 110. For a fee, LAN 110 provides this information to VAN 124 as the user is refueling the vehicle. In another embodiment, VAN 124 is installed in a rental car and tracks the usage of the vehicle using one or more of devices 126, 128, and 130 on VAN 124. When the user returns the vehicle to the rental car facility, communications between VAN 124 and LAN 110 is established, the vehicle usage information is transferred from VAN 124 to LAN 110, and the user's credit card or other account may be charged accordingly.

Figure 2:
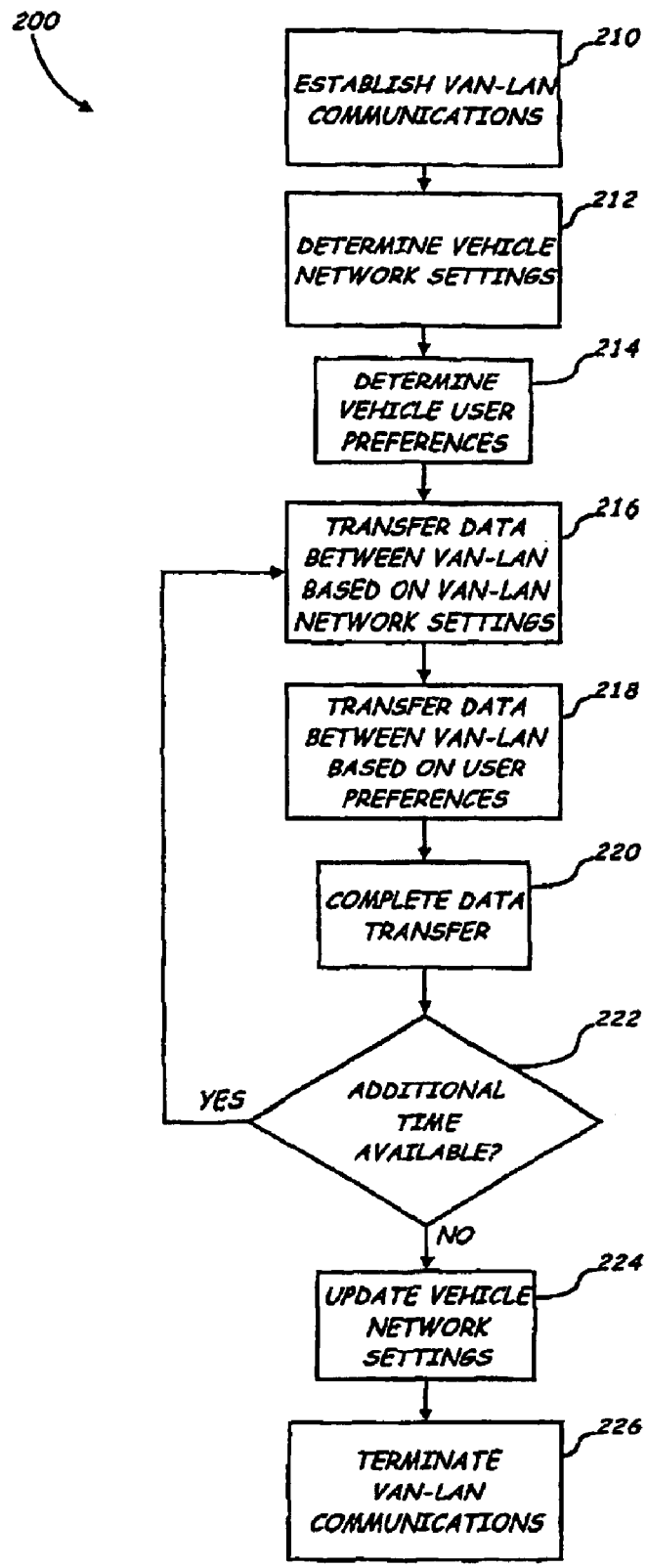
FIG. 2 is a flow diagram of a communications method between a vehicle area network and a local area network in accordance with the present invention.

Referring now to FIG. 2, a flow diagram of a local a communications method between a vehicle area network and a local area network in accordance with the present invention. Method 200 is executed between LAN 110 and VAN 124 in order to provide interactivity between the two respective networks. Method 200 may be executed, for example, when VAN 124 comes within a predetermined range of LAN 110 so that VAN 124 is capable of communicating with LAN 110 via network communications link 120. VAN-LAN communications are established at step 210. The vehicle network settings are determined at step 212. For example, VAN 124 may be set up to communicate at a predetermined data rate using a particular network protocol. This information is provided to LAN 110 so that LAN 110 may adjust communications settings accordingly. Vehicle user preferences set by the user are determined at step 214. For example, the user may have network communications turned to "off", or have the network set to limit communications time to predetermined time limit, such as two minutes or less. Data is then transferred at step 216 between VAN 124 and LAN 110 based on the VAN-LAN network settings as determined at step 212. Data is transferred between VAN 124 and LAN 110 at step 218 based on vehicle user preferences as determined at step 214. For example, if the user has limited network transmission to two minutes or less, LAN 110 will limit data transmitted based on file size and data rate so that the total transmission time is less than the two-minute limit. A determination is made at step 222 whether additional time is available for additional data transfer. If there is additional time, additional data may be transferred by executing steps 216 and 218 according to the additional remaining time. In the embodiment illustrated in FIG. 1, the selection of additional data may be made by LAN 110 or VAN 124 or both in combination and the transfer of the additional data can be made by transmission systems 118 and 122. If no additional time is available, vehicle network settings are updated at step 224. For example, if a user had previously requested a map to a given destination, after receiving that map, the network settings of VAN 124 are changed to no longer indicate the desire to receive that map. After completion of VAN-LAN network data transfer an interactivity, VAN-LAN communications are terminated at step 226.

In general, the present invention provides a method and a system for automatically determining data to be exchanged between two networks or devices operating on the networks and the order in which the data is transferred, based on data criteria (size of files, user access, device interaction, user preferences, history of use, etc.) and the forecasted or predicted time the two networks will be able to communicate. Thus, if a user stops at a service station to refuel the vehicle, LAN 110 at the service station establishes communications with VAN 124, determines from a fuel gauge coupled with VAN 124 how much fuel is needed, determines the fuel flow rate of the gasoline pumps, and based on vehicle preferences transfers an appropriate data set from LAN 110 to VAN 124 so that the data transfer will complete at or prior to the time it takes to refuel the vehicle. In one particular embodiment, LAN 110 obtains credit card or other financial information from VAN 124 in order to pay for the fuel provided to the vehicle.

The method is capable of being executed by software for determining an appropriate VAN-LAN action (choice of data or order of data exchange) based on available data, communicated data or detection of current status. Information present on the system, detected from available methods or received from another network, provides input to a logical process to determine type and order of data to be exchanged.

When communicating data between a vehicle area network (VAN) 124 and other networks (LAN) 110 such as home networks, the communication is directed in one embodiment to a predefined register and initiated by the user. In accordance with the present invention, the presence of communications modules, such as transmission systems 118 and 122, are detected so that communication commences when the transceivers detect they are in range. In addition, in accordance with the techniques described herein, intelligence is included in LAN 110 and VAN 124 to determine whether there is enough time to complete functions such as file synchronization or event exchange of individual files and to select an additional information transfer of a size capable of being transferred. What is implemented is an intelligent method for controlling the data exchange in response to the activity of the user, driver, passengers, and network systems. VAN 124 and LAN 110 are thereby able to determine appropriate network functions to perform, in the order of forecast priority and in the time calculated to be available. In a home embodiment, when LAN 110 detects a vehicle in the garage containing VAN 124, detected for example through garage door opener sensors, proximity or motion detectors and sensors, broadcast transponders, and so on, VAN 124 determines the level of data exchange based on the possibility of the vehicle exiting the garage in a calculated amount of time.

In one example embodiment, if the engine of the vehicle remains on as reported to LAN 110 by VAN 124, LAN 110 accounts for the possibility that the driver or user could leave in a shorter amount of time, and in response only exchange relatively smaller or higher priority data. If the engine was determined to be or reported as off, but the driver or other passengers is determined to be still in the vehicle, for example as detected by seat belt sensors coupled to VAN 124, LAN 110 accounts for the possibility that the stop at home may be long enough to synchronize and schedule musical or other programs for the vehicle sound system, or download newly identified music files from LAN 110 to VAN 124. If the driver exists the vehicle, LAN 110 accounts for the possibility that more lengthy exchanges such as larger file synchronization or downloading of electronic-mail with attachments can be performed before the driver subsequently leaves with the vehicle. Time is another factor optionally accounted for in VAN-LAN interactivity, for example time of day, date, season, and so on. Bringing the vehicle into the garage after 1:00 AM indicates the likelihood of a longer stay as opposed to 4:30 PM when many trips are likely to be made. A history of driver activity is optionally monitored to provide criteria for determining the probability of the time available between vehicle trips. The logic routines executed by LAN 110 or VAN 124 optionally take into consideration the individual user, driver or passenger to make an appropriate determination. By accessing the users schedule programs as stored on a device on LAN 110 or on VAN 124, a determination can be made, for example, that a driver will take a passenger to a prescheduled appointment. The scheduling data optionally affects the order, or priority, in which files are exchanged when scheduling data is taken into account. Files related to that person or activity in interest will take priority over others persons or activities. Although the information of the driver is discussed herein by way of example, the invention is also directed to include the information or profile of at least one or more passengers of at least one vehicle, inclusive or exclusive of the driver, without departing from the spirit or scope of the invention and without providing substantial change thereto.

By detecting the network devices (MP3 players, PDAs, portable computers, etc.) are disposed or otherwise present within the vehicle or carried by passengers in the vehicle, LAN 110 or VAN 124 optionally restructures a download based on the data that is capable of being accessed while the vehicle is in route. If a video player is disposed within the vehicle, LAN 110 can optionally download a travel video before a music file. Many decisions are able to be made by an intelligent system, running on LAN 110 or VAN 124, individually or in combination, using sensing devices inherent to both networks to make an optimal use of the time in which the two networks have available to exchange data. Determination of a download order may also be affected by determining who is in the car, for example, if the driver and the driver's son are determined to be the next occupants of the vehicle, the system does not consider the profile of the driver's spouse in determining what data to download.

The present invention is capable of being adapted to various other applications, such as to service stations or other internetwork situations. If a gas station using LAN 110 for interactive communication with VANs 124 disposed in vehicles pumping gas were able to obtain information from VAN 124, data that was most important or of higher importance to the driver is exchanged. Data more valuable or worthwhile to the user is be provided from LAN 110 to VAN 124 in the time span during which the vehicle remains at the gas station. If the itinerary of the vehicle indicated that the driver of the vehicle is merely passing through for a shorter stop, LAN 110 provides VAN 124 with road construction information and maps. Alternatively, if LAN 110 determines that the present location of the vehicle is a destination, LAN 110 optionally provides to VAN 126 hotel information, local attractions, diner options, and so on, in the area of LAN 110. LAN 110 further optionally bases the provided information on time of day so that, for example, information on breakfast diners is provided in the morning, and information on restaurants is provided in the evening.

If VAN 124 communicates to LAN 110 that the driver prefers country music as an option, such as set by the user as a vehicle preference in VAN 124, in response LAN 110 provides a list of local country music radio stations within the vicinity of LAN 110. As a further option, LAN 110 can alter the presets of a radio device on VAN 110 to tune to those local stations or preference. Alternatively, if for example the user set the vehicle preferences in VAN 124 indicating that the driver or passenger liked fishing, LAN 110 can provide to VAN 124 a map of local fishing spots in the vicinity of LAN 110. The type of file may be chosen based on whether VAN 124 includes a GPS device coupled thereto so that GPS formatted data can be sent to VAN and read by the GPS device for the desired location. A method for logically deciding what data is exchanged in the amount of time LAN 110 and VAN 124 have available for VAN-LAN communication is optionally implemented in accordance with the present invention. While passing each other on a highway or other roadway, two or more VANs 124 and/or one or more LANs 110 may determine that data can be exchanged including a relatively smaller sized file containing traffic information. While stopped at a red light, for example, two VANs 124 in proximity to one another are capable of exchanging driver information. Such an exchange may include a message such as, "Available for dating call me at 555-1212."While parked in a parking lot, two vehicles are capable of exchanging collections of music or videos while the operators of the vehicle are away from their respective vehicles, for example while shopping in a shopping mall. Vehicle and driver identification along with insurance information is capable of being exchanged VAN-VAN between vehicles in the event of an accident involving the vehicles. Information such as the status of vehicle systems, for example, lights, turn signals, brake engagement, speed, use of seat belts, driver and passenger positions within the vehicle, is capable of being exchanged VAN-VAN, and to a VAN 124 disposed in a law enforcement vehicle whose driver is called to the scene for investigation. It should be noted that the invention is not limited to the scenarios of when the vehicle is stopped. For example, vehicle-to-vehicle or vehicle-to-station communications may occur when a first vehicle passes by a second vehicle, or when a first vehicle passes by a first station. The system determines how long the vehicles will be in proximity, for example by measuring the speed of the first vehicle as it passes the second vehicle while traveling in the same direction down a road, such as by the readings from the speedometers of each respective vehicle, and by optionally considering the route scheduled to be taken by each vehicle, or by measuring the speed at which the first vehicle approaches and then passes by the first station. While the first vehicle is within proximity to the second vehicle or the first station, vehicle-to-vehicle or vehicle-to-station communications can occur based on the predicted time of proximity. Information that is capable of being exchanged vehicle-to-vehicle or vehicle-to-station includes, but is not limited to, exchanging web sites or other personal and preferential information, or driver or vehicle identities so that in case of an accident, for example, the identity of possible witnesses can be determined. Many other numerous examples of the type and content information is contemplated as able to be transferred without departing from the spirit or scope of the invention, and without providing substantial change thereto.

Figure 3:
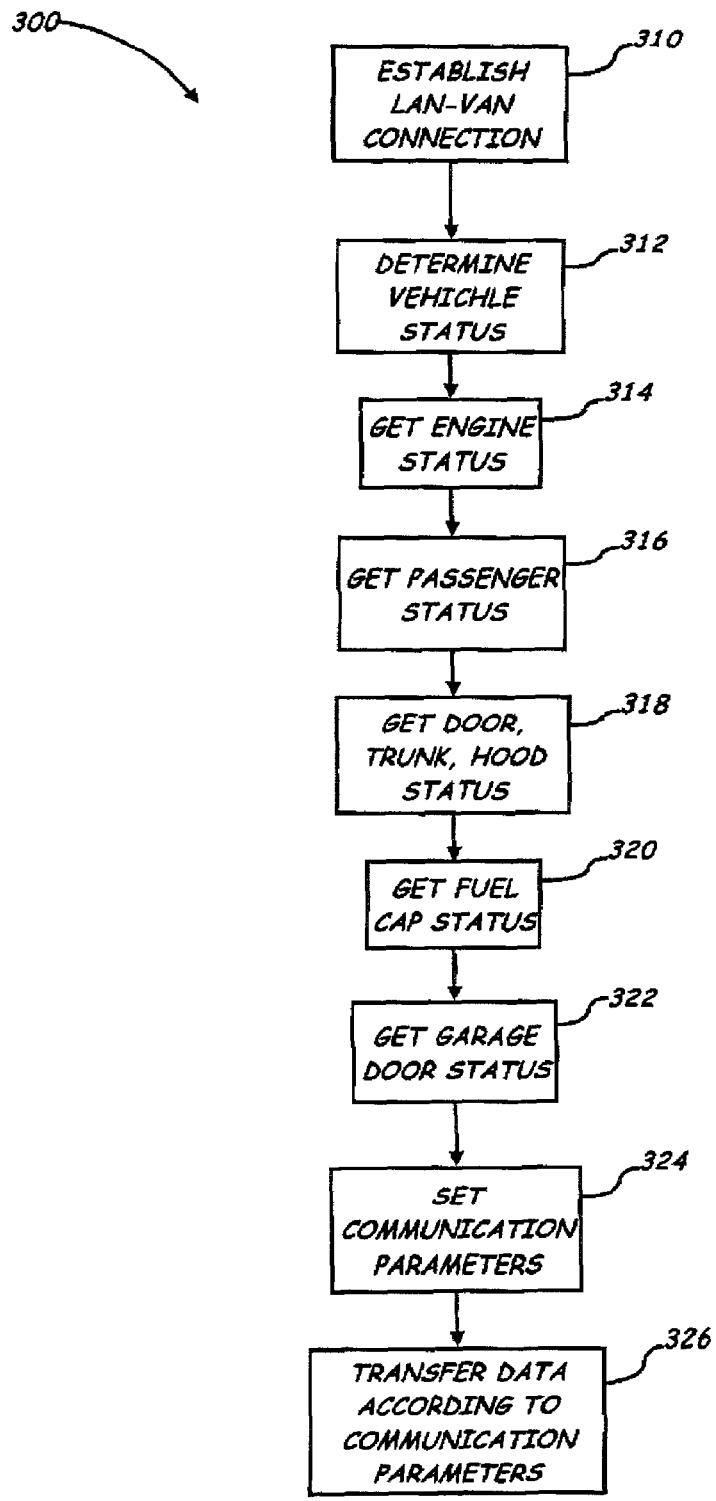
FIG. 3 is a flow diagram of a method for setting communication parameters based on vehicle and network status in accordance with the present invention.

Referring now to FIG. 3, a flow diagram of a method for obtaining vehicle status in accordance with the present invention will be discussed. Method 300 includes a step 310 at which LAN-VAN communications are established. The vehicle status is determined at step 312, including obtaining predefined user preferences, default transmission rates, communications protocols, etc. The engine status is obtained at step 312, for example whether the engine is presently running or off. Passenger status is determined at step 316, such as whether one or more passengers are presently within the vehicle, whether one or more passengers recently exited the vehicle while one or more passengers remain inside, and so on. The status of vehicle ports and other openings is obtained at step 318, such as whether one or more doors are opened or have recently been opened and closed, whether the hood is open, whether the trunk or other cargo area is open, and so on. The fuel cap status is obtained at step 320 to determine whether or not the fuel cap is opened, which can be an indicator that the vehicle is about to be or is currently being refueled. A garage door status is obtained at step 322, including whether a nearby garage door is open or closed, or whether the garage door has been recently opened or closed. Any one or more of the steps of method 300 can be executed by either LAN 110 or VAN 124, alone or in combination. The results of any one or more steps are then evaluated according to logic routines, either by LAN 110 or VAN 124, alone or in combination, to estimate the present time available for LAN-VAN communications. For example, if step 314 indicates that the engine is on or has recently been turned on, step 316 indicates a person in the driver seat of the vehicle, step 318 indicates all ports and doors as closed and the driver door has recently been opened and then closed, step 320 indicates the fuel cap is closes, and step 322 indicates the garage is opened or has recently been opened, it is likely that the vehicle is about to exit the area and leave the range of communications between LAN 110 and VAN 124. Therefore, it can be determined that only a shorter period of time is available for LAN-VAN communications, such as less than 30 seconds, so a VAN-LAN communication is capable of occurring of the estimated transmission time is less than 30 seconds. Other possible permutations and combinations of the steps of method 300 will likewise likely predict various scenarios and a correspondingly associated available transmission time estimate. Thus, communication parameters are set at step 324, such as file size and transmission data rate, and data is transferred at step 326 according to the available estimate transmission time estimate and communication parameters. In one embodiment of the invention, a single profile of a user is utilized to determine communications settings and information transfer, such person typically being a driver of at least one vehicle. In an alternative embodiment, the invention is extrapolated to account for multiple profiles of multiple users, for example profiles of a driver and one or more passengers, with parsing priorities from profile to profile collectively. For example, the profile of one user is set to have a higher priority than the profile of another user, so that information pertaining to the higher priority profile will be transferred before information pertaining to the lower priority profile is transferred.

Figure 4:
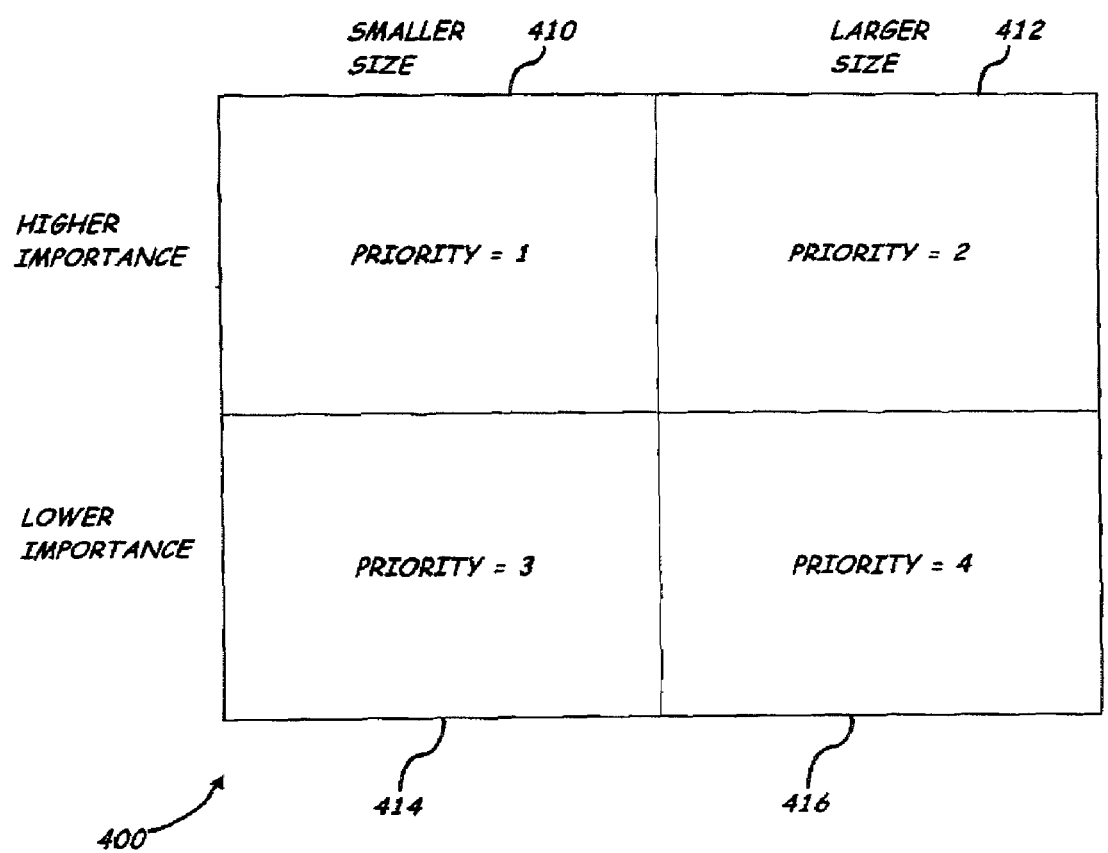
FIG. 4 is a block diagram of a logic chart for determining communication priority in accordance with the present invention.

Referring now to FIG. 4, a logic diagram for determining LAN-VAN transmission priority in accordance with the present invention will be discussed. Priority logic diagram 400 indicates file size on a first axis, a horizontal axis being shown, and further indicates an importance level on a second axis orthogonal to the first axis, a vertical axis being shown. According to priority logic diagram 400, files having a smaller size and a higher importance are assigned priority 1 in region 410. Files having a larger size and a higher importance are assigned priority 2 in region 412. Files having a smaller size and a lower importance are assigned priority 3 in region 414. Files having a larger size and a lower importance are assigned priority 4 in region 416. In one embodiment of the invention, files and other data available for transmission are analyzed, either by LAN 110 or by VAN 124, alone or in combination, and assigned a relative priority score based on predetermined parameters, established by default or by a preference of a user. For example, files being one megabyte or smaller can be categorized as a smaller size, whereas larger files are categorized as a larger size. The size cutoff can vary according to user preference or available communication bandwidth of network transmission medium 120. Files can be assigned a higher importance or a lower importance based on the file content. For example, a file may be tagged with a category of content, such as road map, restaurant listing, gas station, tourist stop, music, advertisement, fishing data, hunting data, hotel data, and so on. The user may assign a higher importance to some categories, and a lower importance to other categories. Once files have been categorized, for example based on importance and size, the files can be assigned a priority score according to priority logic diagram 400. Files can then be transferred LAN-VAN in an order according to the respective priority score, for example lower priority score files will be transmitted before lower priority score files until all files have been transferred or until the time of LAN-VAN communications ends. One embodiment of a priority scoring method is shown in FIG. 4 and discussed therewith, however other alternative embodiments of file priority scoring may be utilized with the invention and using priority logic table 400. For example, region 412 is assigned with priority score 3, and region 414 is assigned priority score 2 in an alternative embodiment. Likewise, higher importance and lower importance may be replaced with local interest and national interest, respectively. As another alternative, priority logic diagram 400 includes a third additional axis on which near future and far future time is rated so that additional priority regions (not shown) may be included in priority logic diagram 400.

Figure 5:
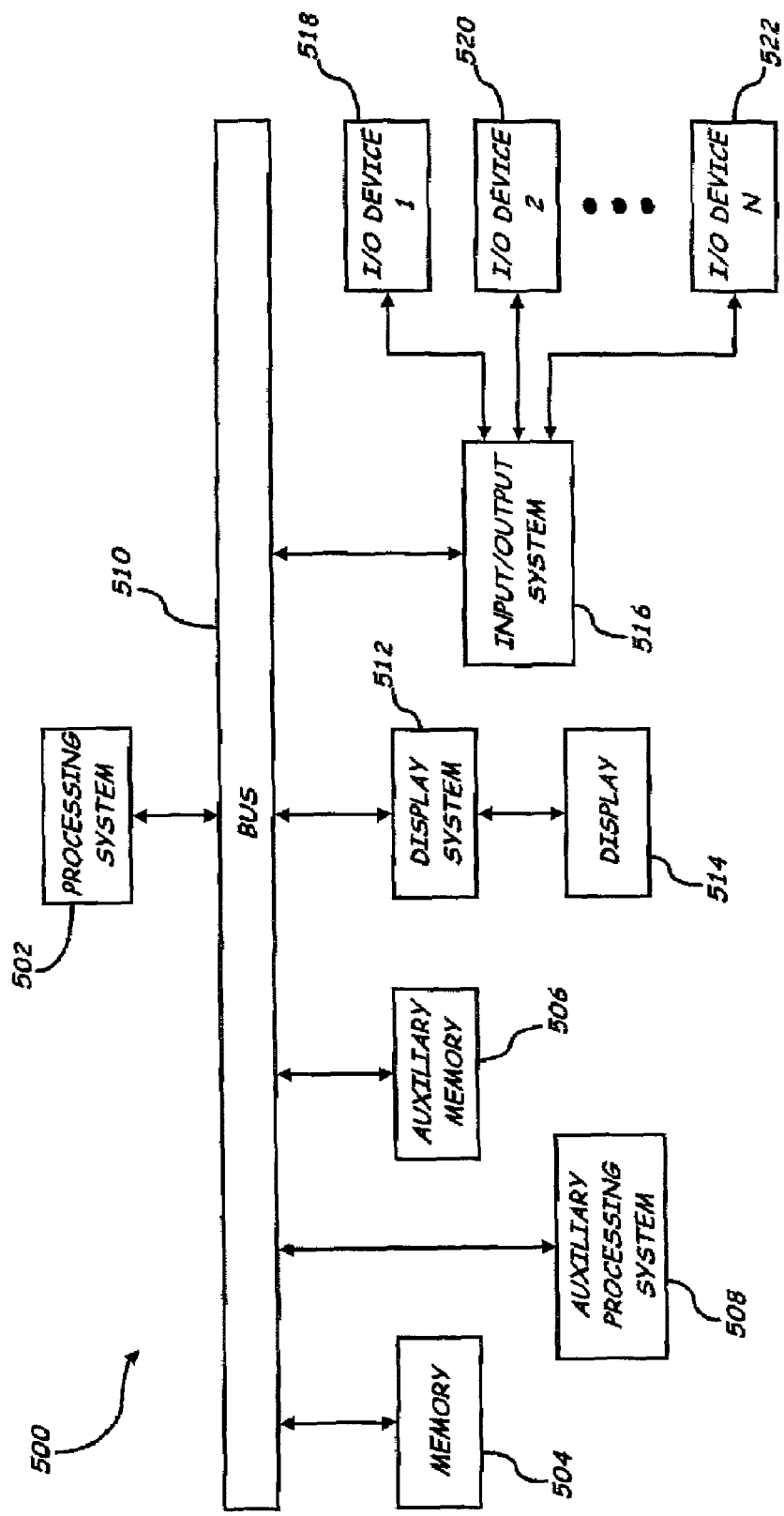
FIG. 5 is a block diagram of a hardware system embodiment capable of tangibly implementing the present invention.

Referring now to FIG. 5, a block diagram of a hardware system for an information appliance in accordance with the present invention will be discussed. Information appliance 500 can be used to tangibly embody LAN 110 and any one or more of its devices 112, 114, and 116, or VAN 124 and any one or more of its devices 126, 128, and 130, by providing hardware components as needed for hardware embodiments of the devices. Furthermore, hardware system 500 tangibly embodies a machine that is capable of being programmed to execute any one or more of the embodiments of the invention as discussed herein, including but not limited to method 200, method 300, and priority logic diagram 400, to provide a useful result. In the embodiment illustrated in FIG. 5, the hardware system 500 is controlled by a central processing system 502. The central processing system 502 includes a central processing unit such as a microprocessor or microcontroller for executing programs, performing data manipulations and controlling the tasks of the hardware system 500. Communication with the central processor 502 is implemented through a system bus 510 for transferring information among the components of the hardware system 500. The bus 510 may include a data channel for facilitating information transfer between storage and other peripheral components of the hardware system. The bus 510 further provides the set of signals required for communication with the central processing system 502 including a data bus, address bus, and control bus. The bus 510 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of the hardware system 500 include main memory 504, and auxiliary memory 506. The hardware system 500 may further include an auxiliary processing system 508 as required. The main memory 504 provides storage of instructions and data for programs executing on the central processing system 502. The main memory 504 is typically semiconductor-based memory such as dynamic random access memory (DRAM) and/or static random access memory (SRAM). Other semi-conductor-based memory types include, for example, synchronous dynamic random access memory (SDRAM), Rambus dynamic random access memory (RDRAM), ferroelectric random access memory (FRAM), and so on. The auxiliary memory 506 provides storage of instructions and data that are loaded into the main memory 504 before execution. The auxiliary memory 506 may include semiconductor based memory such as read-only memory (ROM), programmable read-only memory (PROM), erasable programmable read-only memory (EPROM), electrically erasable read-only memory (EEPROM), or flash memory (block oriented memory similar to EEPROM). The auxiliary memory 506 may also include a variety of non-semiconductor-based memories, including but not limited to magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), etc. Other varieties of memory devices are contemplated as well, including but not limited to memory sticks, and so on. The hardware system 500 may optionally include an auxiliary processing system 508 which may be an auxiliary processor to manage input/output, an auxiliary processor to perform floating point mathematical operations, a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor. It will be recognized that such auxiliary processors may be discrete processors or may be built in to the main processor.

The hardware system 500 further includes a display system 512 for connecting to a display device 514, and an input/output (I/O) system 516 for connecting to one or more I/O devices 518, 520, and up to N number of I/O devices 522. The display system 512 may comprise a video display adapter having all of the components for driving the display device, including video memory, buffer, and graphics engine as desired. Video memory may be, for example, video random access memory (VRAM), synchronous graphics random access memory (SGRAM), windows random access memory (WRAM), and the like. The display device 714 may comprise a cathode ray-tube (CRT) type display such as a monitor or television, or may comprise an alternative type of display technology such as a projection-type CRT display, a liquid-crystal display (LCD) overhead projector display, an LCD display, a light-emitting diode (LED) display, a gas or plasma display, an electroluminescent display, a vacuum fluorescent display, a cathodoluminescent (field emission) display, a plasma-addressed liquid crystal (PALC) display, a high gain emissive display (HGED), and so forth. The input/output system 516 may comprise one or more controllers or adapters for providing interface functions between the one or more I/O devices 518-522. For example, the input/output system 516 may comprise a serial port, parallel port, universal serial bus (USB) port, IEEE 1394 serial bus port, infrared port, network adapter, printer adapter, radio-frequency (RF) communications adapter, universal asynchronous receiver-transmitter (UART) port, etc., for interfacing between corresponding I/O devices such as a keyboard, mouse, trackball, touchpad, joystick, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, etc. The input/output system 716 and I/O devices 518-522 may provide or receive analog or digital signals for communication between the hardware system 500 of the present invention and external devices, networks, or information sources. The input/output system 516 and I/O devices 518-522 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the hardware system 500 of FIG. 5 by one having ordinary skill in the art would not depart from the scope or the spirit of the present invention, and without providing substantial change thereto.

Although the invention has been described with a certain degree of particularity, it should be recognized that elements thereof may be altered by persons skilled in the art without departing from the spirit and scope of the invention. It is believed that the method and apparatus for vehicle based intelligent network interactivity of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof, and further without providing substantial change thereto. It is the intention of the claims to encompass and include such changes.

What is claimed is:

1. A method, comprising:
    establishing communications between a local area network and a vehicle area network when the vehicle area network enters a communication range of the local area network;
    determining a status of the vehicle and communicating the status of the vehicle to the local area network;
    predicting a time period during which the vehicle area network will remain within communication range of the local area network so that communications may occur, said predicting step being based at least in part on the vehicle status determined in said determining step;
    selecting an appropriate file capable of being transferred within the time period predicted in said predicting step;
    transferring the file between the local area network and the vehicle area network during the time period; and
    additionally determining whether a remaining time period exists, the remaining time period being a period between execution of said transferring step and an end of the time period;
    if a remaining time period exists, selecting an additional file of a size capable of being transferred during the remaining time period; and
    additionally executing said transferring step for the additional file capable of being transferred within the remaining time period;
    wherein the selecting of said additional file being based at least in part on a priority determination for prioritizing files based on a personal profile of at least one user so that a file having the highest priority is transferred during the first mentioned time period and a file having the second highest priority is transferred during the remaining time period, said priority determination for prioritizing files being based on both file importance and file size, and said time period predicting step being based on at least one of the following: engine status, passenger status, door status, trunk status, hood status, and fuel cap status.

2. A method as claimed in claim 1, the local area network comprising at least one of the following structures: a home network, a wide area network, a vehicle area network, a personal area network, a fabric area network, and a world wide network.

3. A method as claimed in claim 1, the vehicle area network comprising at least one of the following structures: a home network, a wide area network. a personal area network, a fabric area network, and a world wide network.

4. A method as claimed in claim 1, the local area network comprising at least one of the following structures: a gas station, a truck stop; a residence, a business establishment, a restaurant, a rest area, a tourist shop, a rental car facility, a warehouse, a theater, a service station, a parking lot, a parking garage, an event stadium, and a shopping mall.

* * * * *